(12) United States Patent
Ye et al.

(10) Patent No.: US 6,477,469 B2
(45) Date of Patent: Nov. 5, 2002

(54) COARSE-TO-FINE SELF-ORGANIZING MAP FOR AUTOMATIC ELECTROFACIES ORDERING

(75) Inventors: Shin-Ju Ye, Spring, TX (US); Philippe J. Y. M. Rabiller, Lescar (FR)

(73) Assignee: Halliburton Energy Services, Inc., Houston, TX (US)

( * ) Notice: Subject to any disclaimer, the term of this patent is extended or adjusted under 35 U.S.C. 154(b) by 46 days.

(21) Appl. No.: 09/756,314

(22) Filed: Jan. 8, 2001

(65) Prior Publication Data

US 2002/0091489 A1 Jul. 11, 2002

(51) Int. Cl.$^7$ .................................................. G01V 3/18

(52) U.S. Cl. ........................................................ 702/11

(58) Field of Search ................................ 702/6, 11, 12, 702/13, 7, 8, 14; 703/10; 706/929

(56) References Cited

U.S. PATENT DOCUMENTS 4,646,240 A    2/1987  Serra et al. ................. 364/422

FOREIGN PATENT DOCUMENTS

GB        2215891        9/1989

OTHER PUBLICATIONS

*Clustering Without A Metric*, Geoffrey Matthews et al., IEEE Transactions On Pattern Analysis And Machine Intelligence, vol. 13, No. 2, Feb. 1991, pp. 175–184.
*Robust Clustering With Applications In Computer Vision*, Jean–Michael Jolion et al., IEEE Transactions On Pattern Analysis And Machine Intelligence, vol. 13, No. 8, Aug. 1991, pp. 791–802.
*Threshold Validity For Mutual Neighborhood Clustering*, Stephen P. Smith, IEEE Transactions On Pattern Analysis And Machine Intelligence, vol. 15, No. 1, Jan. 1993, pp. 89–92.
*Fast Parzen Density Estimation Using Clustering–Based Branch And Bound*, Byeungwoo Jeon et al., IEEE Transactions On Pattern Analysis And Machine Intelligence, vol. 16, No. 9, Sep. 1994, pp. 950–954.

(List continued on next page.)

*Primary Examiner*—Donald E. McElheny, Jr.
(74) *Attorney, Agent, or Firm*—Conley, Rose & Tayon, P.C.

(57) ABSTRACT

A method for ordering electrofacies to assist in identification of mineral deposits is disclosed. Automated ordering of electrofacies allows geologists to draw inferences about the geological settings in which sediment deposit occurred without directly examining core samples or outcrops. The electrofacies order is determined by (a) training a one-dimensional linear self-organizing map to form an initial neural network that includes a plurality of neurons. The number of neurons is small in comparison to the number of electrofacies kernels (i.e., not greater than one-third the number of electrofacies kernels). (b1) A neuron is selected from the initial neural network. In the next step (b2), the processor determines if more than one electrofacies kernel is attached to the neuron. (b3) If more than one electrofacies kernel is attached to the neuron, then the neuron is split into the number of electrofacies kernels attached to the neuron. (c) Steps (b1)–(b3) are repeated until all neurons in the initial neural network have been processed. In the next step, (d) a self-organizing map is trained to form a final neural network using the split neurons in the initial neural network as initial state. (e) Steps (b1)–(d) are repeated if more than one electrofacies kernel is attached to a neuron with the initial neural network equal to the final neural network. In the last step (f), each electrofacies kernel corresponding to a neuron in the final neural network is correlated to an order number.

19 Claims, 5 Drawing Sheets

OTHER PUBLICATIONS

*Motion Estimation Via Clustering Matching*, Dane P. Kottke et al., IEEE Transactions On Pattern Analysis And Machine Intelligence, vol. 16, No. 11, Nov. 1994, pp. 1128–1132.

*A Least Biased Fuzzy Clustering Method*, Gerardo Beni, et al., IEEE Transactions On Pattern Analysis And Machine Intelligence, vol. 16, No. 9, Sep. 1994, pp. 954–960.

*Fast Nearest–Neighbor Search In Dissimilarity Spaces*, Andras Farago, et al., IEEE Transactions On Pattern Analysis And Machine Intelligence, vol. 15, No. 9, Sep. 1993, pp. 957–962.

*Application Of Kruskal Multidimensional Scaling (MDS) To Rock Type Identification From Well Logs*, Vaclav Matsas et al., The Log Analyst, Jan.–Feb. 1995, pp. 28–34.

*Automatic Determination Of Lithology From Well Logs*, Pierre Delfiner et al., SPE Formation Evaluation, Sep. 1997, pp. 303–310.

*Synergetic Log & Core Data Treatment: A Methodology To Improve Reservoir Description Through Cluster Analysis*, C. Descalzi, et al., SPE #17637, Society of Petroleum Engineers, Nov. 1988, pp. 1–13.

*The Contribution Of Logging Data To Sedimentology And Stratigraphy*, Oberto Serra et al., SPE 9270, Society of Petroleum Engineers of AIME, Sep. 1980, pp. 1–19.

*Borehole Acoustics And Logging And Reservoir Delineation Consortia, Annual Report 1999*, Earth Resources Laboratory, pp. 1–25.

*Faciolog—Automatic Electrofacies Determination*, M. Wolff et al., SPWLA Twenty–Third Annual Logging Symposium, Jul. 6–9, 1982, pp. 1–23.

*Facies Model, Second Edition*, Roger G. Walker, Geoscience Canada, Reprint Series 1, McMaster University, May, 1984, pp. 16 p.

*The Self–Organizing Map*, Teuvo Kohonen, Proceedings of the IEEE, vol. 78, No. 9, Sep. 1990, pp. 1464–1480.

COARSE-TO-FINE SELF-ORGANIZING MAP FOR AUTOMATIC ELECTROFACIES ORDERING

CROSS-REFERENCE TO RELATED APPLICATIONS

This application relates to the following commonly assigned application entitled "Multi-Resolution Graph-Based Clustering," Ser. No. 09/586,129, filed Jun. 2, 2000, now U.S. Pat. No. 6,295,504, which is hereby incorporated herein by reference.

BACKGROUND OF THE INVENTION

1. Field of the Invention

The present invention generally relates to the geological study of earth formations for the location and exploitation of mineral deposits using electrofacies analysis. More particularly, the present invention relates to a new method for identifying formations of mineral deposits using a user-friendly and reliable ordering technique to order the electrofacies for different sets of log data and interpretation rules.

2. Description of the Related Art

Mineral and hydrocarbon prospecting is based upon the geological study and observation of formations of the earth's crust. Correlations have long been established between geological phenomena and the formation of mineral and hydrocarbon deposits that are sufficiently dense to make their exploitation economically profitable.

The study of rock and soil facies encountered while prospecting for minerals takes on particular importance. As used herein, a facies is an assemblage of characteristics that distinguish a rock or stratified body from others. A facies results from the physical, chemical and biological conditions involved in the formation of a rock that distinguish it from other rocks or soil. This set of characteristics provides information on the origin of the deposits, their distribution channels and the environment within which they were produced. For example, sedimentary deposits can be classified according to their location (continental, shoreline or marine), according to their origin (fluviatile, lacustrine, eolian) and according to the environment within which they occurred (estuaries, deltas, marshes, etc.). This information in turn makes it possible to detect, for example, zones in which the probability of hydrocarbon accumulation is high.

The set of characteristics used to define a facies depends on the situation. For example, a lithofacies may be defined by the rock's petrographic and petrophysical characteristics. These are the composition, texture and structure of the rock. Examples of mineral composition are silicate, carbonate, evaporite, and so on. A rock's texture is determined by its grain size, sorting, morphology, degree of compaction, and degree of cementation. The rock structure includes the thickness of beds, their alternation, presence of stones, lenses, fractures, degree of parallelism of laminations, etc. All of these parameters are related to the macroscopic appearance of the rock.

For extraction of hydrocarbons from geologic formations, the particularly pertinent characteristics of the lithofacies are the porosity of the reservoir rocks and their permeability, as well as the fraction of the pore volume occupied by these hydrocarbons. These aid in estimating the nature, quantity, and producibility of the hydrocarbons contained in such strata.

There are various sources of information on formation lithofacies. Information may be gathered from subsurface observations such as, for example, by the study of core samples taken from rock formations during the drilling of a borehole for an oil well. Such information can also be provided by drill cuttings sent up to the surface from the bottom of a well by means of a fluid (generally drilling mud) injected near the drilling tool. It is not normally cost-effective to identify facies using these methods. Information on geological formations traversed by a borehole is more commonly gathered by a measurement sonde passing through the borehole. The gathered information as a function of the sonde's position along the borehole is then stored or "logged".

Many downhole measurement techniques have been used in the past, including passive measurements such as measuring the natural emission of gamma rays; and active measurements such as emitting some form of energy into the formation and measuring the response. Common active measurements include using acoustic waves, electromagnetic waves, electric currents, and nuclear particles. The sonde measurements are designed to reflect the distinguishing characteristics of the rock facies. Multiple logs and sondes may be used to gather the measurements, which are then correlated and standardized to furnish measurements at discrete levels separated by equal depth intervals. The measurement standardization allows the automation of data interpretation in order to obtain estimates of the rock mineral composition, the porosity of the rocks encountered, the pore size distribution, texture and structure, the pore volume occupied by hydrocarbons, and the ease of flow of hydrocarbons out of the reservoirs in the case of petroleum prospecting. The set of measured formation characteristics values that distinguish the strata in a given borehole is herein termed the electrofacies.

Interpretation studies have demonstrated a strong correlation between the electrofacies and lithofacies, thereby making it possible to identify with confidence the lithofacies of the rocks traversed by boreholes based on the sonde measurements. It has been established that the sets of log measurements (i.e., sample points) which correspond to a given lithofacies form a "cluster" in "data space". That is, when the measured characteristic values of a formation are graphed, the points generally fall into a continuous region that is distinguishable from the regions where points for other formations would fall.

Electrofacies allow geologists to present log data that describe the cored interval of a petroleum reservoir in a standardized format such as that shown in FIG. 1. In this figure, the leftmost column 110 shows lithofacies of a core description coded using one set of standard interpretation rules (depositional environments are ordered according to a bathymetric profile) and the rightmost column 120 shows the electrofacies obtained by log clustering and after ordering over same depth interval. In terms of the clusters in data space, the electrofacies ordering shown in FIG. 1 may be equated to drawing a path that connects each of the clusters. The sequence in which the path visits the nodes is the order of the nodes. When considered in this manner, the relationship between the clusters is thereby simplified to a single dimension. The electrofacies may then be easily compared to each other, and the vertical distribution of electrofacies in a well, when represented in this standardized format, may more easily be compared to known sedimentary sequences. The ordering of electrofacies also allows a geologist to draw inferences about the geological setting at the time of sediment deposition or to the diagenetic history of the sediments.

Rules to manually order electrofacies are empirical, based on the observation of shale content, cementation, sediment grain size and sorting. These parameters reflect the level of the sediment deposition area with respect to base sea level and reflect the energy of the deposition environment. Thus, the rules used to order electrofacies traditionally allow the geologist to survey the vertical and lateral variation of facies that define the porous sedimentary bodies' constituent of the petroleum reservoir.

An electrofacies ordering is initially obtained and continuously updated by calibration on core material and log interpretations pertaining to core intervals (log measurements of the formations from which the cores were taken). As discussed below, ordering of the electrofacies requires interpreting the relative positions of electrofacies kernel points in the log space and interpreting the geologic significance of core interval logs. No absolute rules exist for electrofacies ordering, only guidelines adapted for different geological settings that are calibrated in the early stages of the exploration process. Because of the complexity of the calibration process and for economic reasons, core descriptions are often taken as an absolute reference. If log interpretation methods to generate electrofacies do not match the physical core descriptions, then the log interpretation methods are blamed for the discrepancy.

Geologists generally begin electrofacies ordering by projecting log responses onto a set of so-called porosity crossplots (e.g., "RhoB-Nphi", "RhoB-DT", "Nphi-DT", etc). In order to simplify the ordering process, a third variable (GR, PEF, Resistivity, Neutron-Density Separation etc.) is often displayed as a color-coding of the log responses to both discriminate and identify different soil and sediment formation characteristics.

A typical electrofacies ordering process for a detrital formation made of shales, silts and sandstones, can be summarized as follows. A geologist examines a RhoB vs. Nphi crossplot as shown in FIG. 2a that identifies electrofacies (clusters not specifically shown) of a formation. RhoB is a density measurement, and Nphi is a hydrogen index measurement. High density and high hydrogen index may indicate shaly rock while low density and high hydrogen index may indicate porous clean (non-shaly) sandstone.

The geologist orders the electrofacies in this crossplot based on decreasing shale content and increasing porosity. This means that assignment of electrofacies order number increases the lower right part of the crossplot (shale area) 210 towards its upper right part 220 by following a "boomerang" or "banana" shaped path connecting the clusters. The central part 230 of the "boomerang" or "banana" is located in the lower left corner as shown in FIG. 2a, on a limestone line with approximately 10% porosity. Higher order numbers are then assigned to highly cemented sections of the formation for electrofacies identified by the lower left part 240 of the neutron-density crossplot as shown in FIG. 2b. Such higher number electrofacies may occur either in deep depositional environments such as upper or lower shorefaces or as a lag at the base of a channel. Because the deposition energy associated with such electrofacies is insignificant compared to the total energy of the depositional environment, these electrofacies are preferably displayed so that they are readily apparent to the geologist (usually by using color coding and indentation in the final ordered electrofacies map).

It is unusual to have only a single crossplot when performing electrofacies ordering. Generally multiple logs are available and manually ordering three log data sets, for example, requires analyzing two or three different crossplots. To order larger numbers of log data sets requires analyzing even more crossplots simultaneously making this process slow and subjective. Ordering of electrofacies manually by the geologist is not an easy task because of the multidimensional nature of the problem. The human brain is very poor in its ability to recognize and manipulate multidimensional data distributions and generate an optimal ordering based on the data distribution. Thus, it is desirable to develop a system and method that, in a relatively constant, reliable, and systematic manner, permits automatic ordering of electrofacies to extract information about the geological formation. Despite the apparent advantages of such a system, to date no such system has been implemented.

SUMMARY OF THE INVENTION

Accordingly, there is disclosed herein a method for automatically ordering electrofacies to identify formations of mineral deposits. In one embodiment of this method, logs are made over multiple levels within an interval along the borehole in order to obtain a group of several measurements for each of these levels. With each such level of the borehole interval is associated a sample point within a multidimensional space defined by the different logs. The sample point coordinates are a function of the logging values measured at this level. The sample points thus obtained will form a scatter diagram within this multidimensional space.

The sample points of this scatter diagram are used to determine a set of characteristic modes, each corresponding to a zone of maximum density in the distribution of these samples; each mode is regarded as a characteristic of a respective cluster and the surrounding samples of this cluster are related to it. An electrofacies is designated for each of the modes thus characterized, and the electrofacies are ordered in a sequence. A graphic representation is produced as a function of the sequence of electrofacies thus obtained. The characteristic modes of each cluster are made up of sample points coming from the measurements themselves.

Automated ordering of the electrofacies permits geologists to draw inferences about the geological settings in which sediment deposit occurred without directly examining core samples or outcrops. The electrofacies order is determined by (a) training a one-dimensional linear self-organizing map to form an initial neural network that includes a plurality of neurons. The number of neurons is small in comparison to the number of electrofacies kernels (i.e., not greater than one-third the number of electrofacies kernels). (b1) A neuron is selected from the initial neural network. In the next step (b2), the processor determines if more than one electrofacies kernel is attached to the neuron. (b3) If more than one electrofacies kernel is attached to the neuron, then the neuron is split into the number of electrofacies kernels attached to the neuron. (c) Steps (b1)–(b3) are repeated until all neurons in the initial neural network have been processed. In the next step, (d) a self-organizing map is trained to form a final neural network using the split neurons in the initial neural network as initial state. (e) Steps (b1)–(d) are repeated if more than one electrofacies kernel is attached to a neuron with the initial neural network equal to the final neural network resulting from previous iteration. In the last step (f), each electrofacies kernel corresponding to a neuron in the final neural network is correlated to an order number. In the final neural network, more neurons than electrofacies kernels will be present; thus, some neurons may not correspond to an electrofacies kernel.

Training the self-organizing map to form a neural network requires initializing the neurons so that they are interconnected in a one-dimensional array. Electrofacies kernels are input for a given number of cycles to the neural network. In each cycle, each electrofacies kernel is presented to the network, a winner neuron is calculated for each electrofacies kernel that is the nearest neuron to the electrofacies kernel. The winner neuron is moved towards the electrofacies kernel and induces with decreasing intensity its neighbor neurons in the neural network to move towards the electrofacies kernel.

Experimentation confirms that the above method allows accurate ordering of the electrofacies derived from the logging measurements obtained within an interval of geological formations traversed by a sonde traveling in a borehole.

DESCRIPTION OF THE DRAWINGS

For a more detailed description of the preferred embodiments of the present invention, reference will now be made to the accompanying drawings, wherein.

Figure 1:
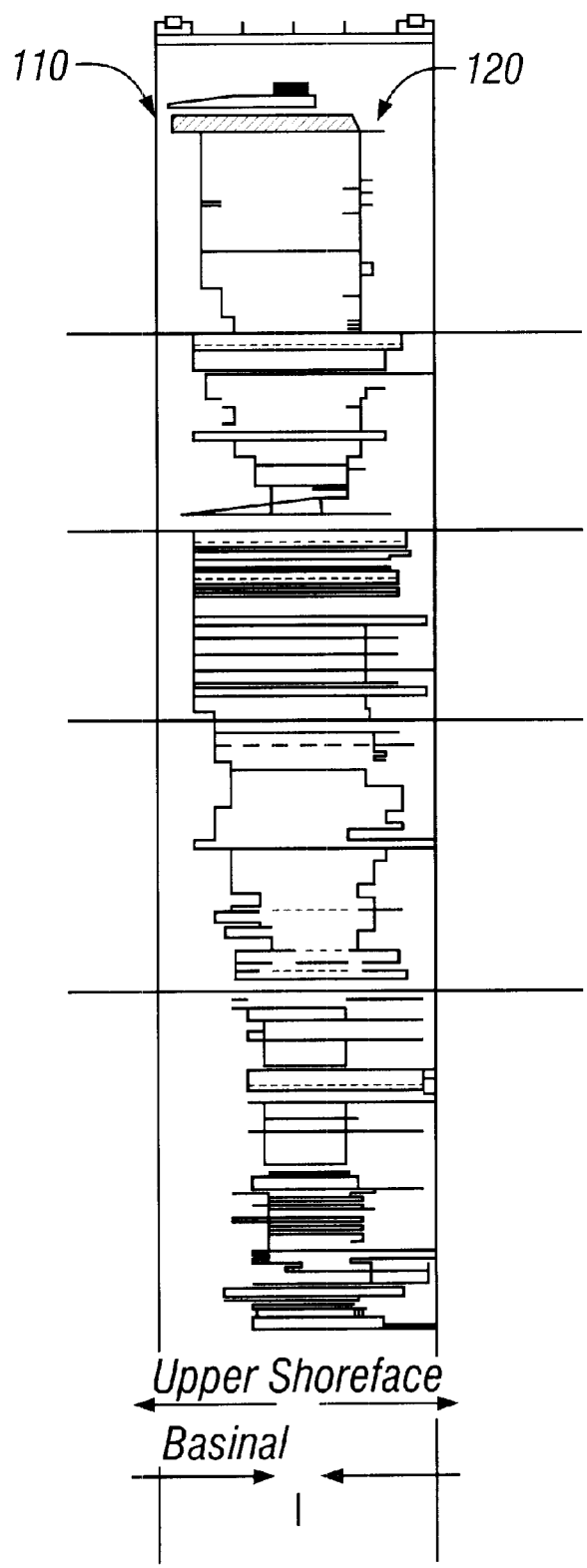
FIG. 1 illustrates the lithofacies of a core sample (leftmost column) and ordered electrofacies (rightmost column)
Figure 2A:
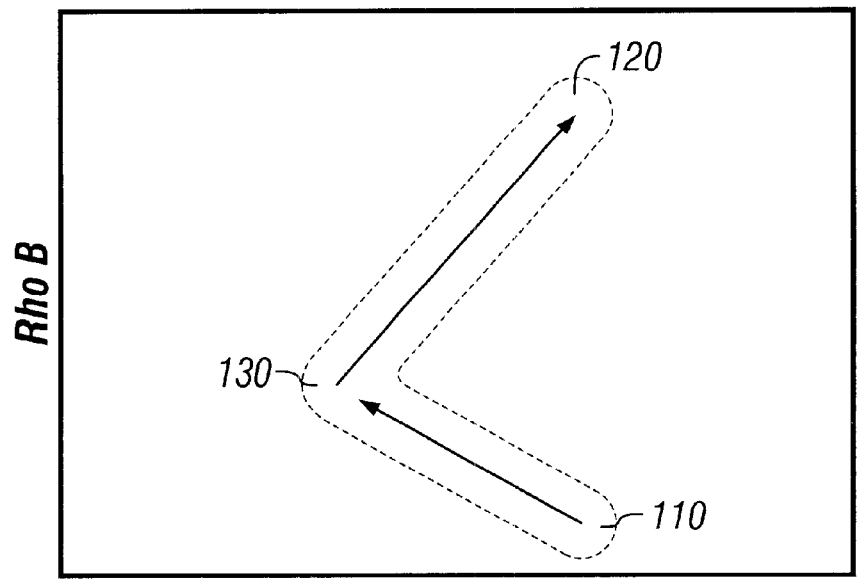
FIGS. 2a and 2b illustrate manual electrofacies ordering on a neutron-density crossplot.
Figure 2B:
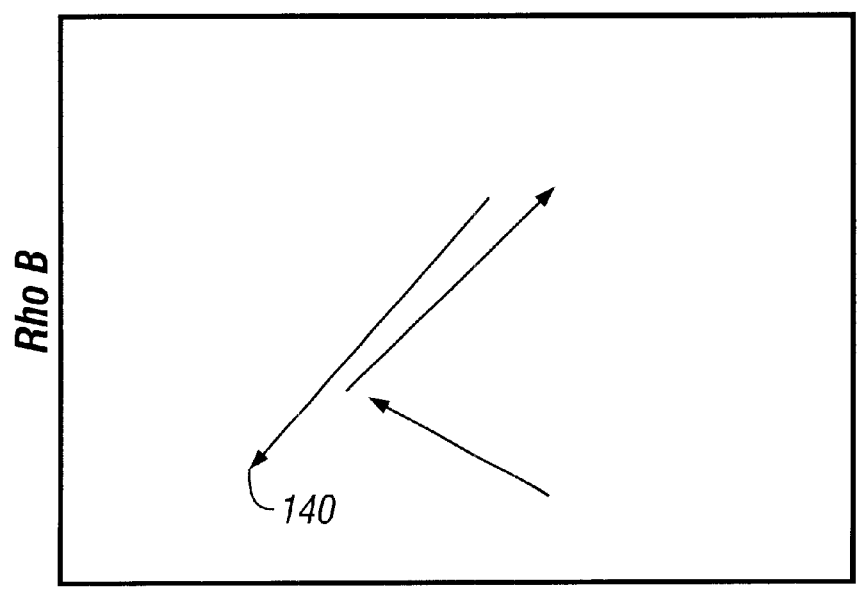

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENT

Figure 3:
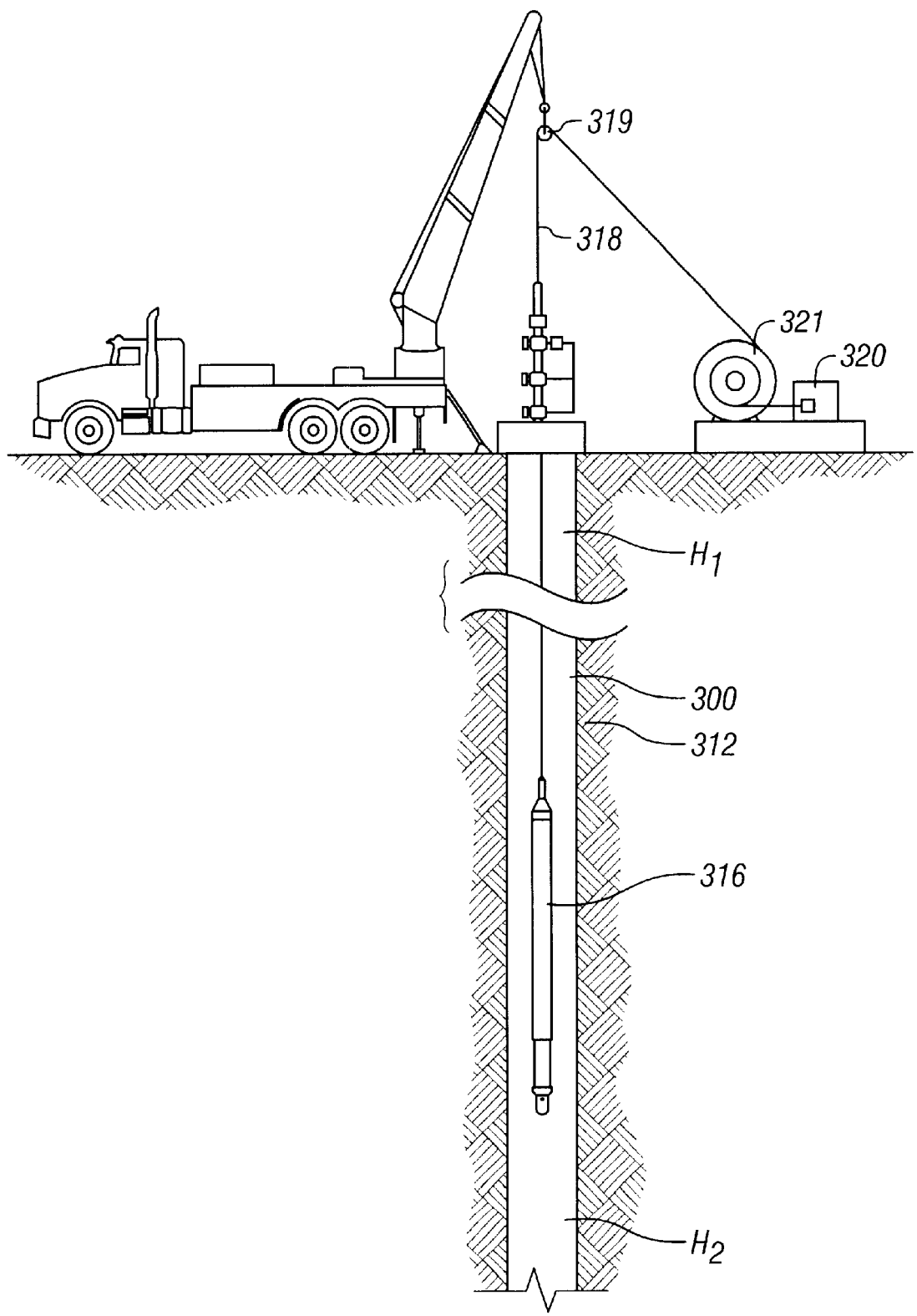
FIG. 3 illustrates logging equipment in operation in a borehole.

FIG. 3 shows logging equipment in a borehole 300 going through earth formations 312. The equipment includes a sonde 316 suspended in the borehole 300 at the end of a cable 318. Cable 318 connects sonde 316 both mechanically and electrically, by means of a pulley 319 on the surface, to a control installation 320 equipped with a winch 321 around which the cable 318 is wound. The control installation includes recording and processing equipment known in the art that make it possible to produce logs, i.e., graphic representations of the measurements obtained by the sonde 316 according to the depth of the sonde in the borehole or well 300.

The borehole 300 passes through a series of earth formations (not specifically shown) that is typically composed of a series of zones or "beds". The zones are identified by the rock facies they contain, e.g., clay, limestone, etc. From the geological viewpoint, each of these successive zones is characterized by a relative homogeneity that is revealed by a set of characteristic data values (facies). These values vary from one zone to another, but have a relatively limited range of variation within a given zone. These data, which depend in particular on the mineralogical composition, the texture and the structure of the rocks making up these zones, identify respective facies.

It is possible to establish a correspondence between, on the one hand, different facies characterized by mineralogical factors, texture and structure and, on the other hand, electrofacies which can be obtained directly from a suitable quantitative analysis of a set of logs measured by the sonde as it traverses the borehole. The possibility of establishing such a correspondence between electrofacies and facies is capable of providing a valuable aid in the geological knowledge of a zone of the earth's crust within a given region, such knowledge being useful in completing the information usually available to geologists and, in certain cases, helping them in the interpretation of the facies encountered to obtain information on the history of the formations and for determining the concentrations of mineral deposits.

An approximate image of the facies may be produced by first obtaining a number of logs over a borehole interval $H_1–H_2$. The measured values are discretized and correlated in depth to have, for each level of the interval considered, a set of distinct log values. In one embodiment, the measurements are discretized into levels at 15-cm intervals. [1]The set of log values thus obtained is analyzed to determine groups of consecutive levels that have log values within a given range. The upper and lower values of the range are based on the potential variations that may be caused by, e.g., borehole conditions such as roughness or caving of the borehole walls. Those consecutive levels having log values in the given range may be considered to share a "true" physical characteristic value that is substantially constant over those levels. In this manner, those zones having relatively constant values may be portrayed as facies having the indicated measurement values.

Figure 4:
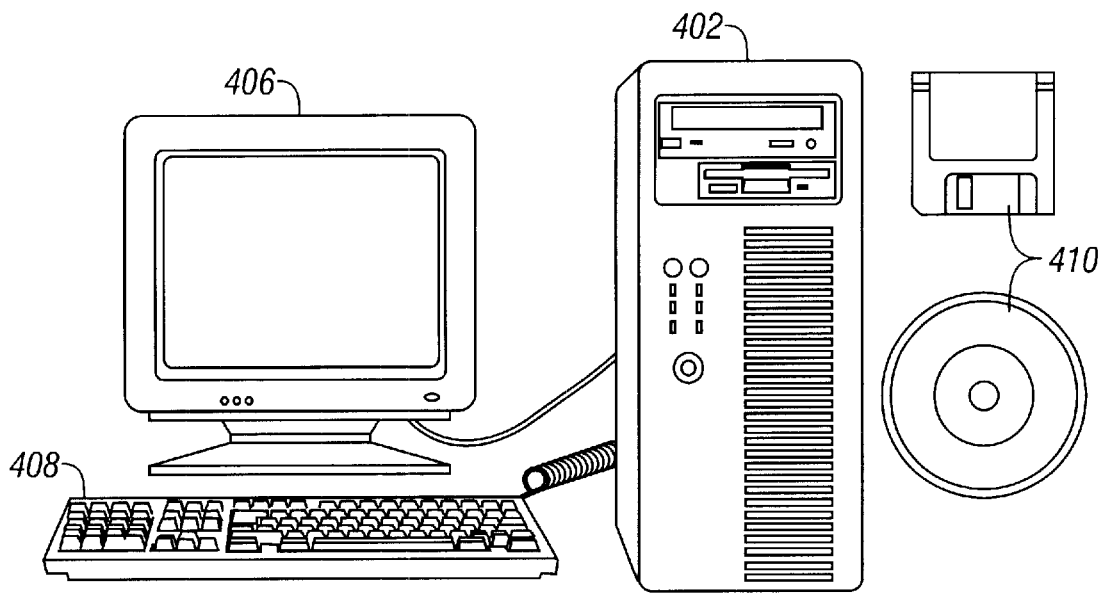
FIG. 4 illustrates a computer system that orders electrofacies and can determine mineral compositions of the earth formation.

To generate an image of the facies using the logged data points, processing of the logged data measured by the sonde as it traverses the formation may be handled at the well site by a computer system such as that shown in FIG. 4. The computer system consists of a keyboard 408 and a monitor 406 to permit user interaction with the computer tower 402 containing the CPU and peripheral hardware. Logs gathered at the well site may be graphically displayed on the monitor 406 and analyzed to determine electrofacies. Ordering of the electrofacies (described below) may then be performed to help determine the petrophysical characteristics of the formation.

Alternatively in a second embodiment, because of cost, space, power, and transportation restrictions, one may prefer storage of the logged data gathered by the sonde in a portable information storage medium such as a 3.5" diskette, tape or recordable compact disc 410. Processing of the data for determination of formation characteristics may then occur at the office or laboratory using more powerful CPUs at a substantially lower cost than at the well site.

Figure 5:
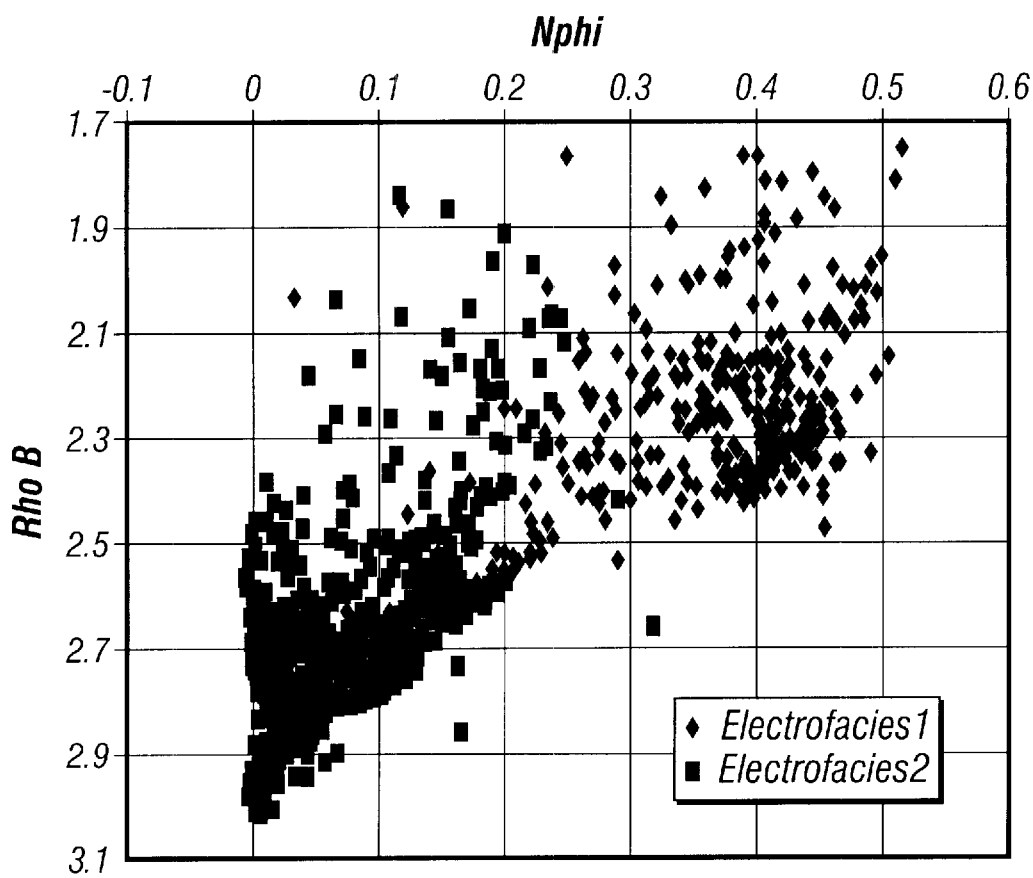
FIG. 5 illustrates the scattering of points representative of the values of two characteristic parameters of the formations measured within a given depth interval.

As shown in FIG. 5, if one analyzes a scattering of points representative of the logs carried out on a succession of levels in a borehole interval, it is noted that the distribution density of these points in the scatter varies. This figure is the result of Multi-Resolution Graph-based Clustering (MRGC) using four logs (Nphi, RhoB, GR and DT), although only the two log measurements RhoB and Nphi are shown in the two dimensional graph. RhoB corresponds to a density measurement log and Nphi is a porosity measurement log measured by a Compensated Neutron Log (CNL) tool. Examples of other log measurement properties include natural gamma radiation measurements (GR), temperature measurement (HRT), inverse of square root of resistivity measurement near the wall of the well in the "invaded" zone (HRXO), acoustic wave transit time measurement (DT), measurement of resistivity of formation far from well or borehole (RT), and measurement of resistivity near borehole wall (RXO). These measurements may be made by logging tools such as resistivity tools, induction tools, nuclear magnetic resonance tools, thermal neutron decay tools, and gamma radiation tools, among others. FIG. 5 demonstrates in two dimensions the results of one of the automatic clustering techniques described below and in the co-pending application cited previously. The automatic clustering techniques may be generally applied to N-dimensions for N log measurement properties.

Once a set of measurement points has been obtained, it is desired to partition the points. Initially, this partitioning is achieved by gathering the points into clusters using a cluster identification algorithm. Many such algorithms exist, and they almost universally require that the data be normalized.

There are several ways to normalize the data. One classical method, frequently used, is to limit the data in an unit hypercube $[0,1]^d$, d being the number of features, which corresponds to the number of dimensions. In each dimension, that dimension's minimal value is subtracted from the data, and the difference is divided by the total range of the data in that dimension. In another method, the average value of each feature is subtracted from the data, and the difference divided by the standard deviation. The normalization changes the distance between data points and affects the natural separation of data points, but it is desirable to prevent an improper choice of scale in one dimension from dominating the measurements in other dimensions.

The clustering algorithms can be divided into parametric algorithms, and non-parametric algorithms. Parametric algorithms are generally regarded as being less desirable than non-parametric algorithms because parametric algorithms are based on modeling of the data, whereas non-parametric algorithms make no assumptions about the data pattern. One consequent advantage of non-parametric algorithms is that they are capable of recognizing clusters of varied shapes.

Once clustering of the measurement points is complete, the identified electrofacies are ordered in the log space. The problem of electrofacies ordering is comparable to the Traveling Salesman Problem (TSP). In the Traveling Salesman Problem, a salesman must visit N cities. The salesman must find the shortest path passing once and only once through every city/neuron in the set.

The electrofacies ordering problem is only slightly different from the Traveling Salesman Problem. First, the log data set is always non-uniformly distributed and generally (but not necessarily) in the shape of a boomerang in the log space. Second, the path should start from one corner of the dataset and stop at the other corner. Finally, the electrofacies ordering is a multidimensional problem and not limited to a two dimensional plane.

One solution to the TSP is through the use of a Kohonen neural network self-organizing map ("SOM"). A self-organizing map is a biologically plausible artificial neural network, designed to model the formation of an ordered mapping between specific concepts/thoughts and their locations in the brain. The resulting map is ordered and reflects the distribution of its inputs in that regions of the input space with a high probability of occurrence are allocated more output values (neurons) than regions with a low probability of occurrence.

The Kohonen neural network SOM belongs to the competitive-learning category of neural-network algorithms. The neural network is made up of a given number of neurons interconnected into a one or two-dimensional array (or any shape appropriate for the application, such as ring or torus). The interconnection among neurons is also called lateral relationship among the neurons. In the TSP, the neurons are used to represent cities, and they are interconnected to form a ring.

The neurons are randomly initialized, that is, they are initially distributed randomly. The input data are iteratively presented to the neural network for a given number of cycles. The order of the input data presented to the neural network is randomly different in each cycle. In the TSP, the input data are the city locations, presented in terms of their coordinates.

When an input vector x is presented to the neural network, the neuron r, which is the closest neuron to x, is selected to be the winner. The winner r moves towards x and induces its neighbors on the network to do so as well, but with a decreasing intensity along the network. The attraction strength also depends on the learning stage. To ensure a good global ordering of the map, it is necessary, in the early learning stages, to apply a stronger strength to a broader zone on the network. In the late stages, learned neurons become more independent and stable. The correlation between the motions of the neighbor neurons intuitively leads to a minimization of the distance between any two neighbors, yielding a short tour for the TSP. The neurons will progressively become independent from one another, and, eventually, each will attach to one city.

From a data-analysis point of view, Kohonen's SOM performs a mapping from a high-dimensional space of input data onto a low (one or two) dimensional lattice of points (neurons). It can be considered as non-linear regression of the reference vectors (neurons) through the input data.

Unfortunately, this neural network provides a poor solution to the TSP because the network is not guaranteed to converge. If a route intersection appears at the initial learning stage, it remains until the iterative steps complete. Further, even when it converges, the results obtained are quite sub-optimal.

One solution to the disadvantages of the Kohonen SOM is to use an algorithm that starts with only one neuron located at the origin in the plane containing all cities. If a neuron wins the competition for two different cities in the same cycle, then a new neuron is created with the same coordinates as the winner. This newly created neuron is inserted into the ring as the neighbor of the winner. Both of them are inhibited for one more cycle iteration. A neuron is deleted, if it does not win a competition during three complete cycles. Experimentally, the number of neurons created turns out to be less than twice the number of cities, but the algorithm terminates when the number of neurons is exactly equal to the number of cities, and when each neuron is associated with a single city. The modified algorithm can be described as a creation-deletion mechanism using elastic neural networks but implemented as a neural network SOM for improving the original Kohonen neural network SOM.

Use of the modified solution described above results in reasonable computation times for 50-city networks. For a problem with 1000 or more cities, the best solution may require twelve or more hours of computation time because of the slow convergence parameter used to ensure a good result, but a suboptimal solution may be calculated in twenty minutes on a sequential computer.

In the preferred embodiment, electrofacies ordering is performed using a variation of the neuron splitting technique of Kohonen's modified neural network SOM algorithm described above.

Neuron splitting techniques have been used previously in batch competitive learning algorithms. Unlike Kohonen's SOM, in batch competitive learning algorithms there is no lateral relationship between the neurons. As the neurons are split using a neuron splitting technique, they form a tree-structured map. Rather than adapt the neurons after each input data vector, all of the data vectors are applied "simultaneously", the winners calculated, and the adaptations to each neuron determined and combined before the neurons are adapted.

In batch competitive learning, neuron splitting algorithms initially train a network containing only one neuron. The input data are repeatedly applied until the neuron's adaptive motion becomes negligible. After this neuron has been trained so that further training produces negligible change, a copy of this neuron is created with a small random offset to enable a meaningful partition to be formed in the next training stage. When these two neurons have trained sufficiently, each neuron is again split and the process is repeated until the network of the required size is created. When training has finished, the resulting mapping has some structure since two neurons, which split early, must spread far apart to represent the input adequately, while neurons, which split late, need not change much. This structure is enhanced if at each stage, each of the new neurons has the same offset added. If neurons are numbered according to the splitting order, the neuron numbering can reflect the structure of the data set.

The dynamic splitting of neurons strategy starts with very few neurons, so a good initial state is quickly determined. In each subsequent splitting step, the "new" neuron structure begins from an initial state determined by the "old" neuron structure. This causes the learning process to operate more efficiently, so that the new neuron structure converges more easily. The resulting map is better distributed on the input data space both globally and locally.

The neuron splitting strategy applied on a self-organizing map is a technique that reduces the execution time of SOM. Since a large proportion of the neurons are trained in the early learning stages, the update cost is linear to the network size. Searching for the winning neuron also depends on the network size. A substantial computational saving is achieved by using the splitting approach to reduce the size of the network in the initial stages.

As mentioned above, the electrofacies-ordering problem is similar to the Traveling Salesman Problem but not exactly the same. A ring structure path is not needed for the problem of electrofacies ordering since the electrofacies should be ordered starting from one corner of the "boomerang" and ending at the other corner. A simple one-dimensional line-structure path is the best fit for the electrofacies ordering problem. The input data are preferably the coordinates of the electrofacies cluster kernels. These may be determined by, e.g., the Multi-Resolution Graph-based Clustering (MRGC) method, although other methods may also be used.

A geologist manually ordering the electrofacies must examine the log data distribution (the kernels of electrofacies model) on the Nphi-RhoB crossplot to recognize the global data trend. The geologist draws a line to fit this data trend, and this line corresponds to the lowest resolution of the electrofacies ordering. The electrofacies ordering is refined little by little according to this base line by observing the relationship and distance between data points.

Figure 6:
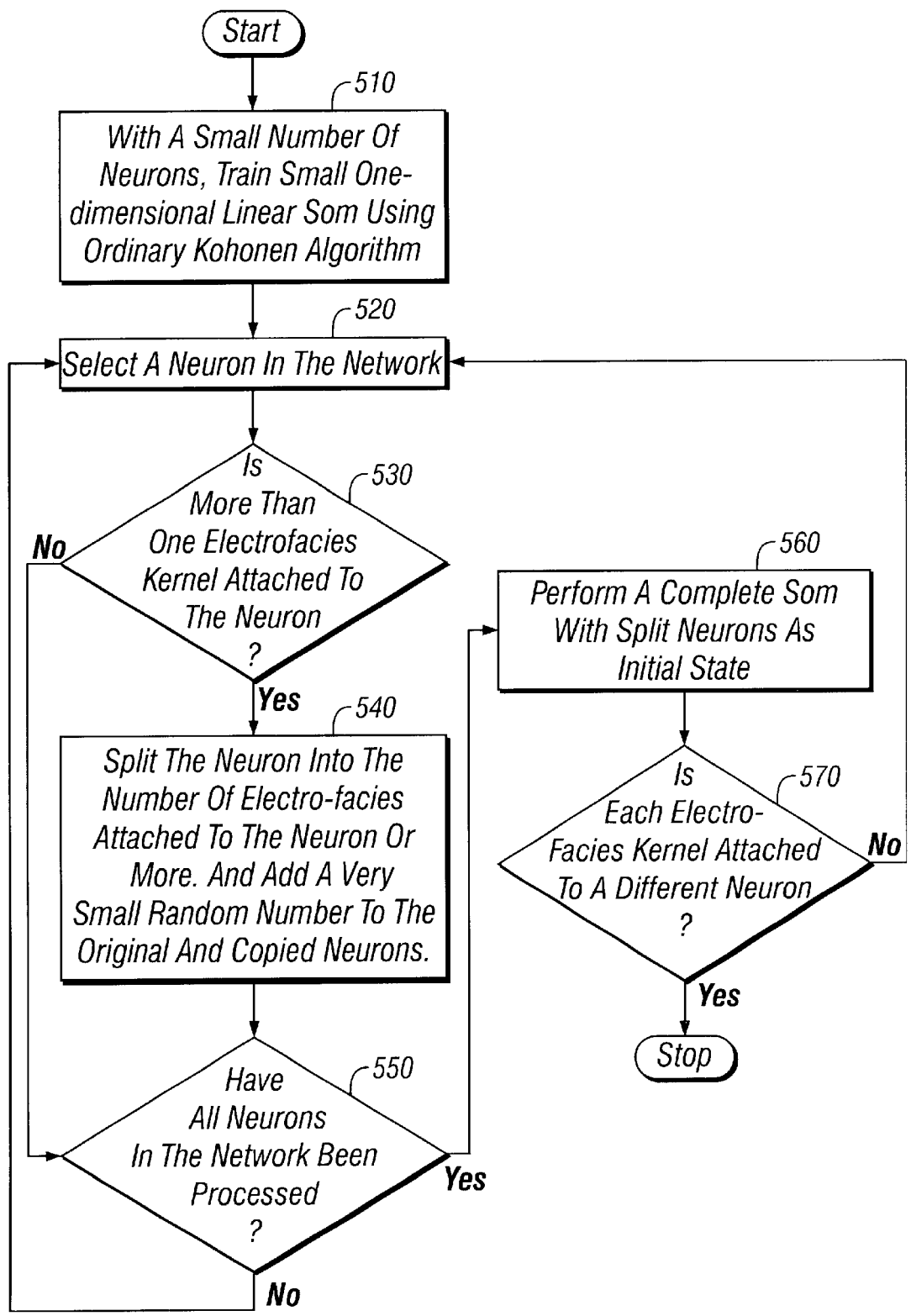
FIG. 6 is a flow diagram showing the steps for automatic electrofacies ordering.

A small self-organizing map behaves in a similar manner. When the size of the map is small (small number of neurons), converged neurons are arranged on the line of the global data trend. If neurons are added with slight random offset beside the low-resolution neurons, and this new map used as an initial state, the learning process refines the ordering towards a higher resolution. Repeating this process causes each electrofacies kernel to attach to a different neuron, resulting in electrofacies ordering. Because the electrofacies are ordered from low resolution to high resolution, the automatic electrofacies ordering process is herein called a Coarse-to-Fine Self-Organizing Map ("CFSOM"). The method is described with reference to FIG. 6 as follows:

Step 1: Train a small, one-dimensional line-structured self-organizing map using the ordinary Kohonen neural network SOM algorithm 510.

The initial ordered set of neurons consists of an initial number of neurons that should be much less than the number of electrofacies kernels to ensure that the neural network can converge to the low-resolution base line. The number of electrofacies kernels typically does not exceed 50. One third of the total number of electrofacies kernels is a good compromise for convergence and speed. Starting with only one neuron may be an inefficient use of execution time as it operates at too low resolution.

Step 2: After the base line is drawn, (i.e., the initial neural network is completely trained), for each neuron 520 having more than one electrofacies kernel attached to it 530, split the neuron into several neurons 540. The set of neurons equal to the number of electrofacies kernels attached to the neuron being replaced comprises the replacement set. Add a very small random number to the original and copied neurons 540. Then perform a complete self-organizing map learning cycle with the split neurons as initial state 560. The initial ordered set of neurons enlarged by replacing each neuron with replacement sets of neurons as needed comprise the augmented set of neurons.

A kernel is "attached" to a neuron if it is the neuron closest to the kernel. Step 2 uses the same SOM algorithm as Step 1. Note that each neuron is split into the number of electrofacies attached to it. This results in a good compromise of convergence and speed for this step.

Step 3: Repeat the neuron splitting and SOM process of step 2 with the augmented set of neurons until electrofacies ordering is complete. The ordering is complete when each electrofacies kernel is attached to a different neuron 570.

Repetition of step 2 (blocks 520–560 in FIG. 6) refines the electrofacies ordering. However, some neurons may still be attached by more than one electrofacies kernel and other neurons not attached by any electrofacies kernels. The iterative nature of step three eventually results in each neuron being attached by no more than one electrofacies kernel 570 in the final refinement steps.

In the algorithm described above, a complete self-organizing map learning cycle is performed each time all neurons in the network have been processed (i.e., after all neurons with more than one electrofacies kernel attached have been split). This differs from prior neuron splitting algorithms where only one complete SOM learning cycle is performed throughout all the processing. In prior neuron splitting algorithms, neurons are split after several cycles of input data presentation. In such algorithms, the learning ability of late split neurons becomes very small and thus convergence becomes slow.

The Coarse-to-Fine Self-Organizing Map algorithm for automatic electrofacies ordering has many advantages. It is relatively simple, not requiring modification of parameters for the SOM when the problem size (i.e., the number of electrofacies needing to be ordered) is changed. Unlike prior neuron splitting algorithms, the neuron deleting step is not necessary in the CFSOM algorithm. The CFSOM algorithm of the preferred embodiment is fast on any computer system. Furthermore, the CFSOM algorithm finds the optimal solution in high dimensional space, allowing large numbers of logs to be considered, unlike the average geologist trying to manually order electrofacies who is limited to three logs. Finally, the algorithm for automatic ordering also removes all operator bias.

Once logged data has been clustered to determine the electrofacies, the above algorithm is able to independently order the electrofacies without any need for human expertise. Thus, the ordering algorithm does not need human intervention to specify a starting point for ordering or need human expertise to adjust convergence parameters. The algorithm is able to generate an optimal solution in one try without human intervention.

Numerous variations and modifications will become apparent to those skilled in the art once the above disclosure is fully appreciated. For example, clustering and ordering techniques may be applied in fields such as economic analysis, image analysis, quality control for manufacturing and statistical analyses of other kinds. It is intended that the following claims be interpreted to embrace all such variations and modifications.

What is claimed is:

1. A method of ordering a set of kernels in a multi-dimensional data space, wherein the method includes:
    placing an ordered set of neurons in initial positions in the multi-dimensional data space;
    training the ordered set of neurons on the set of kernels;
    determining a number of kernels attached to each neuron in the ordered set;
    augmenting the ordered set of neurons by replacing each neuron with an ordered replacement set of neurons, wherein the replacement set includes a number of neurons that equals a number of kernels attached to the neuron being replaced;
    repeating said training, determining, and augmenting with the augmented set of neurons until each neuron has no more than one kernel attached.

2. The method of claim 1, wherein the initial positions are randomly determined.

3. The method of claim 1, wherein the initial ordered set of neurons consists of an initial number of neurons, and wherein the initial number is no more than one third the number of kernels in the set of kernels.

4. The method of claim 1, wherein the multi-dimensional space has a number of dimensions that is determined by a number of logs, and wherein the number of logs exceeds two.

5. The method of claim 4, wherein the logs include RhoB and Nphi.

6. The method of claim 1, wherein the training comprises:
    reordering the set of kernels into a sequence; and
    for each kernel in the sequence:
        selecting a nearest neuron;
        adapting the position of the nearest neuron to reduce a distance between the kernel and the nearest neuron;
        adapting the positions of neurons adjacent to the nearest neuron in the ordered set of neurons to reduce a distance between the kernel and the adjacent neurons.

7. The method of claim 6, wherein the acts of claim 6 are repeated multiple times.

8. The method of claim 1, wherein the determining includes:
    determining for each kernel a nearest neuron;
    determining for each neuron a number of kernels for which the neuron is the nearest neuron.

9. The method of claim 1, wherein the augmenting includes:
    determining initial positions of the replacement neurons by adding random perturbations to the position of the neuron being replaced.

10. The method of claim 1, wherein the augmenting includes:
    ordering the augmented set by ordering the replacement sets in the order of the neurons they replaced to create an ordered set.

11. A method of ordering electrofacies of a geological formation traversed by a borehole comprising:
    (a) training a one-dimensional linear self-organizing map to form a initial neural network that includes a plurality of neurons, said number of neurons small in comparison to the number of electrofacies kernels;
    (b1) selecting a neuron from the initial neural network;
    (b2) determining if more than one electrofacies kernel is attached to the neuron;
    (b3) splitting the neuron into a number of electrofacies kernels attached to the neuron if more than one electrofacies kernel is attached to the neuron; and
    (c) repeating steps (b1)–(b3) until all neurons in the initial neural network have been processed.

12. The method of claim 11 wherein said number of neurons is not greater than one-third the number of electrofacies kernels.

13. The method of claim 11 wherein said training a one-dimensional linear self-organizing map further includes:
    initializing the neurons so that the neurons are interconnected in a one-dimensional array;
    inputting electrofacies kernels for a given number of cycles to the initial neural network;
    calculating a winner neuron for each electrofacies kernel presented to the initial neural network, said winner neuron being the nearest neuron to the electrofacies kernel; and
    moving the winner neuron towards the electrofacies kernel, said winner neuron inducing with decreasing intensity its neighbor neurons in the initial neural network to move towards the electrofacies kernel.

14. The method of claim 11, further comprising:
    (d) training a self-organizing map to form a final neural network using the split neurons in the initial neural network as initial state;
    (e) repeating steps (b1)–(d) if more than one electrofacies kernel is attached to a neuron with the initial neural network equal to the final neural network; and
    (f) correlating each electrofacies kernel corresponding to a neuron in the final neural network to an order number.

15. An apparatus for performing electrofacies ordering, comprising:
    a memory unit configured to store log measurement points in multidimensional space; and
    a processing unit configured to retrieve the log measurement points from the memory unit, wherein said processing unit is configured to calculate an ordering of the electrofacies of a geological formation.

16. The apparatus of claim 15, wherein ordering of the electrofacies of a geological formation is determined by:
   (a) training a one-dimensional linear self-organizing map to form an initial neural network that includes a plurality of neurons, said number of neurons small in comparison to the number of electrofacies kernels;
   (b1) selecting a neuron from the initial neural network;
   (b2) determining if more than one electrofacies kernel is attached to the neuron; and
   (b3) splitting the neuron into a number of electrofacies kernels attached to the neuron if more than one electrofacies kernel is attached to the neuron.

17. The apparatus of claim 16, wherein the number of neurons is less than one-third the number of electrofacies kernels.

18. The apparatus of claim 16, wherein said training a one-dimensional linear self-organizing map further includes:
   initializing the neurons so that the neurons are interconnected in a one-dimensional array;
   inputting electrofacies kernels for a given number of cycles to the initial neural network;
   calculating a winner neuron for each electrofacies kernel presented to the initial neural network, said winner neuron being the nearest neuron to the electrofacies kernel; and
   moving the winner neuron towards the electrofacies kernel, said winner neuron inducing with decreasing intensity its neighbor neurons in the initial neural network to move towards the electrofacies kernel.

19. The apparatus of claim 16, wherein determining the order of the electrofacies of a geological formation further comprises:
   (c) repeating steps (b1)–(b3) until all neurons in the initial neural network have been processed;
   (d) training a self-organizing map to form a final neural network using the split neurons in the initial neural network as initial state;
   (e) repeating steps (b1)–(d) if more than one electrofacies kernel is attached to a neuron with the initial neural network equal to the final neural network; and
   (f) correlating each electrofacies kernel corresponding to a neuron in the final neural network to an order number.

\* \* \* \* \*